United States Patent
Theriot et al.

(10) Patent No.: US 11,268,578 B2
(45) Date of Patent: Mar. 8, 2022

(54) SLIP CLUTCH COMPRISING AN AXIS OF ROTATION

(71) Applicant: Schaeffler Technologies AG & Co. KG, Herzogenaurach (DE)

(72) Inventors: Laurent Theriot, Strasbourg (FR); Hartmut Mende, Strasbourg (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 84 days.

(21) Appl. No.: 16/644,519

(22) PCT Filed: Aug. 7, 2018

(86) PCT No.: PCT/DE2018/100691
§ 371 (c)(1),
(2) Date: Mar. 5, 2020

(87) PCT Pub. No.: WO2019/047992
PCT Pub. Date: Mar. 14, 2019

(65) Prior Publication Data
US 2020/0292007 A1 Sep. 17, 2020

(30) Foreign Application Priority Data
Sep. 6, 2017 (DE) .......................... 102017120530.6

(51) Int. Cl.
| *B60K 6/38* | (2007.10) |
| *F16D 7/02* | (2006.01) |
| *F16D 13/58* | (2006.01) |
| *F16D 13/74* | (2006.01) |
| *B60K 6/26* | (2007.10) |

(52) U.S. Cl.
CPC ............... *F16D 7/025* (2013.01); *B60K 6/38* (2013.01); *F16D 13/583* (2013.01); *F16D 13/74* (2013.01); *B60K 6/26* (2013.01); *B60Y 2200/92* (2013.01); *B60Y 2400/4244* (2013.01)

(58) Field of Classification Search
CPC ........ F16D 7/025; F16D 13/583; F16D 13/74; B60K 6/38; B60K 6/26; B60Y 2200/92; B60Y 2400/4244
See application file for complete search history.

(56) References Cited

U.S. PATENT DOCUMENTS

| 2009/0301836 A1* | 12/2009 | Murakami | ............. F16D 43/216 |
| | | | 192/56.62 |
| 2012/0142437 A1* | 6/2012 | Doman | .................. F16D 43/215 |
| | | | 464/46 |

(Continued)

FOREIGN PATENT DOCUMENTS

| CN | 102472361 A | 5/2013 |
| CN | 105422774 A | 3/2016 |

(Continued)

*Primary Examiner* — David J Hlavka
(74) *Attorney, Agent, or Firm* — Kevin Parks

(57) ABSTRACT

A slip clutch includes an axis of rotation, an input side, an output side, and a pressable friction package for transmitting a predetermined maximum torque between the input side and the output side. The pressable friction package includes a lubricated friction lining with a predetermined coefficient of friction, and an overload spring for applying an axial clamping force to the pressable friction package.

12 Claims, 2 Drawing Sheets

(56) References Cited

U.S. PATENT DOCUMENTS

| | | | | |
|---|---|---|---|---|
| 2013/0116086 A1* | 5/2013 | Hibino | ................. | B60W 20/10 |
| | | | | 477/5 |
| 2013/0244799 A1* | 9/2013 | Sugiyama | ................. | F16D 7/00 |
| | | | | 464/46 |
| 2014/0094321 A1* | 4/2014 | Miyagawa | ............. | F16D 7/025 |
| | | | | 464/46 |
| 2015/0377319 A1* | 12/2015 | Usui | ................... | F16F 15/1395 |
| | | | | 464/46 |
| 2016/0040723 A1* | 2/2016 | Nakagaito | ................ | F16D 3/12 |
| | | | | 464/68.1 |
| 2016/0084318 A1* | 3/2016 | Nishikawa | ......... | F16F 15/1395 |
| | | | | 464/61.1 |
| 2016/0340158 A1* | 11/2016 | Maghsoodi | ............. | F16D 25/14 |
| 2016/0340159 A1* | 11/2016 | Maghsoodi | ............. | B66D 1/12 |

FOREIGN PATENT DOCUMENTS

| | | | |
|---|---|---|---|
| DE | 2433585 | A1 | 1/1976 |
| DE | 102007000648 | A1 | 5/2008 |
| EP | 0466783 | A1 | 1/1992 |
| EP | 1176339 | B1 | 11/2006 |
| EP | 2226528 | A2 | 9/2010 |
| EP | 3096035 | A1 | 11/2016 |
| JP | H09292003 | A | 11/1997 |
| JP | 2010106948 | A | 5/2010 |
| JP | 2012141000 | A | 7/2012 |
| JP | 2005337398 | A | 12/2015 |

\* cited by examiner

SLIP CLUTCH COMPRISING AN AXIS OF ROTATION

CROSS-REFERENCE TO RELATED APPLICATIONS

This application is the United States National Phase of PCT Appln. No. PCT/DE2018/100691 filed Aug. 7, 2018, which claims priority to German Application No. DE102017120530.6 filed Sep. 6, 2017, the entire disclosures of which are incorporated by reference herein.

TECHNICAL FIELD

The disclosure relates to a slip clutch having an axis of rotation for a drivetrain and a drivetrain having such a slip clutch, and a motor vehicle having such a drivetrain.

BACKGROUND

Slip clutches are known from the prior art, in particular slip clutches having a plate damper, which are employed, for example, in a belt drive of a motor vehicle. It is intended by means of the function of the slip clutch to ensure that an overload torque applied to the belt, and especially peak torques resulting from torque fluctuations, are not passed on to the units which are driven by the belt operation or which drive the latter. When such an overload is present on a belt pulley which has such a slip clutch, the slip clutch disengages automatically, so that torque transfer is interrupted or is limited to a maximum torque, also called slip torque. This maximum torque is defined by means of the one friction lining or plurality of friction linings used, which is pressed together with a corresponding frictional partner having an appropriate opposing friction surface by means of an overload spring. With the frictional partner, for example a support plate, the friction lining forms a friction pair. The (partial) maximum torque results from the particular coefficient of friction of the friction pair (approximately) multiplied by the particular mean diameter (of the effective area) of the friction lining and multiplied by the clamping force present on the particular friction pair. When there are a plurality of such friction pairs, these respective partial maximum torques are added together cumulatively. If the (total) maximum torque is exceeded, an overload thus being present, then the clamping force is overcome and the frictional partners separate from one another by an axial movement. The transmission of torque is thus limited to a maximum torque.

In hybrid applications, for example, having an internal combustion engine and having a regenerative motor, for example, which are able to propel or support each other in various operating situations, high constancy of friction coefficient is demanded, so as to guarantee that torque can be reliably transmitted up to a maximum torque defined as exactly as possible. At present, a high constancy of friction coefficient is achieved by balancing tolerances of the friction coefficient by selection of the friction linings, and furthermore by adjusting the overload spring which produces the clamping force. This is normally accompanied by a 100% measurement in the assembly sequence.

SUMMARY

The disclosure relates to a slip clutch having an axis of rotation for a drivetrain, having at least the following components: an input side; an output side; a pressable friction package to transmit torque by means of a predetermined friction coefficient up to a predetermined maximum torque, between the input side and the output side; and an overload spring to produce an axial clamping force to press the friction package below a predetermined overload corresponding to the maximum torque. The slip clutch is characterized above all in that the friction package includes at least one friction lining, which has the predetermined friction coefficient with a lubricant applied.

The slip clutch proposed here is configured to transmit torque about an axis of rotation up to a predetermined maximum torque. The axis of rotation is referenced below, when the axial direction, radial direction or circumferential direction and corresponding terms are used without a specifically different indication. The slip clutch can be employed, for example, in a traction pulley of a traction drive, preferably in a belt starter-generator hybrid application. A traction drive includes at least two traction pulleys, and in most cases at least one tensioning pulley and/or at least one return pulley. A suitable traction means is, for example, a belt, preferably a v-belt. A traction pulley is, for example, a belt pulley, preferably an (engageable and disengageable) belt pulley decoupler.

An input side is, for example, the crankshaft of an internal combustion engine or a corresponding shaft connection, preferably with a spline connection or a (central) screwed connection. The output side is, for example, a traction means carrier, for example for a belt, preferably a v-belt, or a corresponding (indirect) connection to a traction means carrier. But the slip clutch can also be employed in such a way that it is connected, for example, to a regenerative motor, to its generator shaft of a regenerative motor, in which case the input side here is, for example, a shaft connection for the generator shaft, and the output side is a traction means carrier. However, it is known from customary hybrid applications that an inverse torque flow is a regular operating state, so that in the preceding examples the input side then forms the traction means carrier and the output side the shaft connection. The slip clutch proposed here can also be employed in other torque transmitting systems however, for example in an aligned connection of two shafts which are configured to deliver torque and/or receive torque.

In the torque flow between the input side and the output side, a friction package is provided, which is relatively rotatable within itself, having at least one friction pair comprising an input-side frictional partner and at least one output-side frictional partner. Such an input-side frictional partner is connected firmly, that is, permanently to the input side, indirectly or directly, in a torque-transmitting manner. Such an output-side frictional partner is connected firmly, that is, permanently to the output side, indirectly or directly, in a torque-transmitting manner. The frictional partners are pressed with a predetermined axial clamping force by means of an overload spring, for example a diaphragm spring, so that by means of the friction package resulting from the coefficient of friction of the friction package a torque up to a predetermined maximum torque can be transmitted between input side and output side. If the maximum torque is exceeded, then an axial escape force arises and the friction package detaches itself with a separating motion in the axial direction, since the predetermined clamping force of the overload spring is exceeded. Then a relative rotational motion, namely a slip, takes place between the frictional partners of the friction package, and the transmittable torque is decreased, for example to the predetermined maximum torque, or to the point where no more torque can be transmitted.

According to the above exemplary application, that reliably prevents the crankshaft of the internal combustion engine from having an excessive, opposing torque load, for example when downshifting a transmission gearset as a result of the moment of inertia of a dual mass flywheel (DMF) or a piston stroke in the combustion operation of the internal combustion engine and a simultaneous opposing torque load coming from the regenerative motor, due for example to inertia.

It is proposed here that the friction package be designed with at least one such friction lining, preferably that all friction linings to which a lubricant is applied have the predetermined (total) coefficient of friction corresponding to the predetermined maximum torque. In previously known friction clutches, dry linings are employed. However, these do not have a satisfactory constancy of friction coefficient for some applications, or result in too great a variance of the maximum torque. Employing a friction lining with lubricant applied, that is, a wet lining, achieves, among other things, an increased constancy of friction coefficient as a result of reduced abrasion and reduced aging effects. As a result, the variance of the maximum torque is reduced, and furthermore preferably over a longer service life. In an especially preferred embodiment, the friction linings employed are greased, oiled or impregnated with a lubricant, so that the friction lining includes a lubricant reservoir and wet operation of the friction lining is sustained over a long service life. Preferably, a continuous addition of lubricant and/or reapplication of lubricant during rotational servicing is not necessary.

According to a preferred embodiment of the slip clutch, the slip clutch also includes a damper unit which is inserted between the input side and the output side in the torque flow; the damper unit is preferably a plate damper, having one or more spring dampers arranged in a carrier disk.

In this preferred embodiment, the slip clutch also includes a damper unit which is configured to even out a torque arriving at the input or output; that is, to absorb superimposed torque fluctuations elastically and partially dissipatively, and to pass them to the output or input with time delay and/or diminished. The damper unit is preferably inserted ahead of the friction package in a main direction of operation, for example on the shaft connection side for use on a crankshaft, so that the friction package is only changed to overload operation, that is, to a disconnecting state, if the damper unit is loaded beyond its capacities, for example coming to a hard blockage in a stop or a coil spring. Alternatively, the arrangement is configured in the reverse so that the friction package protects the damper unit against excessive torque input, for example so that the damper unit is never overloaded with a torque overload peak in excess of its designed load limit.

The damper unit is preferably a plate damper, in which an inner disk is connected with an outer disk in a torque-transmitting manner by means of a spring damper or a plurality of spring dampers. The inner disk, for example, is connected firmly in a torque-transmitting manner to the input side, and the outer disk is connected firmly correspondingly in a torque-transmitting manner to the friction package which is on the output side relative thereto, or vice versa. In another embodiment, the friction package is positioned on the input side relative to the damper unit, and correspondingly the inner disk and outer disk are each firmly connected in a torque-transmitting manner. The spring damper is positioned concentrically to the axis of rotation, or the plurality of spring dampers are positioned rotationally symmetrically to the axis of rotation, so that with torsion of the inner disk to the outer disk the lever length of the torque remains (nearly) constant. A spring damper includes, for example, a bow spring and/or a spring assembly having a straight spring axis. Furthermore, in one embodiment the dissipation elements are provided which convert an energy input into heat, for example.

According to a preferred embodiment of the slip clutch, the friction package is housed in a wet chamber and the wet chamber is preferably filled or can be filled with a lubricant.

With this preferred embodiment, the duration of the reserve of a lubricant and/or a heat extraction can be increased, so that a greater constancy of friction coefficient and/or a constancy of friction coefficient over a longer life can be achieved. During assembly of the slip clutch, the wet chamber is filled with a lubricant, the wet chamber preferably being filled in such a way that the friction lining or friction linings are immersed in the lubricant over their entire radial extent.

According to a preferred embodiment of the slip clutch, the wet chamber is closed radially outside, and has radially inside and/or axially to the side at least one through opening for a connecting element for connecting to the input side or output side in a torque-transmitting manner.

With this preferred embodiment, the centrifugal effect resulting from the rotation of the slip clutch, which acts on the lubricant in the main operating state, is taken advantage of by closing the wet chamber radially toward the outside. That is, the lubricant cannot escape radially outward, or can do so only to such a small extent that sufficient lubricant remains preserved in the wet chamber over the desired service life. A side wall adjacent to this radially outer wall of the wet chamber is closed radially toward the inside over an appropriately suitable extent. As a result of the presence of a centrifugal force, the lubricant is accelerated into the wet chamber and held there, and preferably is kept away from the through opening.

The through opening here is preferably configured so that a sufficient sealing effect against discharge in the state of the slip clutch due to gravity is completely or adequately prevented. For example, a radial shaft sealing ring and/or a labyrinth seal is provided. Alternatively, the quantity of lubricant, for example for splash lubrication, is little enough that when the slip clutch is at a standstill the lubricant, following gravity, can collect below in the wet chamber without draining out. The wet chamber is preferably permanently connected to the side which rotates in the most operating states: in a hybrid application, for example, the side of the traction means, when ancillary units driven by the traction means are to be operated (almost) uninterrupted.

A connecting element extends though the at least one through opening, for example to a damper unit positioned radially inside, preferably the outer disk of the damper unit in the form of a plate damper. The wet chamber preferably forms an element in the torque flow. Torque is consequently transmitted through the through opening to the friction package, and is transmitted from the friction package to the wet chamber, which is then firmly connected accordingly to the input side or the output side in a torque-transmitting manner. According to the alternative design described above having a damper unit inserted downstream, the wet chamber is connected, for example, to the inner disk of a damper unit in the form of a plate damper, while the input side or the output side is connected to the friction package through the at least one through opening by means of the connecting element.

In a preferred embodiment, the through opening is formed as an encircling ring opening, so that a relative rotation of any number of revolutions between the wet chamber and the connecting element is possible. For some applications it is sufficient or advantageous to limit a relative rotation between the connecting element and the wet chamber to a predetermined angle and to provide a plurality of through openings for it; the through openings have a predetermined length in the circumferential direction corresponding to the desired maximum angle of rotation, and accordingly form a (safety) stop.

According to a preferred embodiment of the slip clutch, the wet chamber forms at least one frictional partner of the friction package, preferably a counter plate, and/or a counter bearing for the overload spring, preferably a diaphragm spring.

In this preferred embodiment, the wet chamber integrally assumes the task of forming at least one frictional partner of the friction package, so that no additional axial and/or radial construction space is needed for a wall of the wet chamber, because the latter replaces the frictional partner or supplements it in providing support. Preferably in combination with but also independent of the preceding description, in one embodiment the wet chamber is configured as a counter bearing for the overload spring, so that for the latter also no additional axial and/or radial construction space comes up in comparison to a design having dry linings and/or wet linings without a wet chamber. In the combined embodiment, the wet chamber has a frictional partner, i.e. the counter plate in that case, and the counter bearing for the overload spring. Positioned between them is at least one friction disk having a friction lining toward the counter plate and having a (spring-side) friction lining toward the overload spring. Positioned between the spring-side friction lining and the overload spring is preferably a support plate, which is firmly connected to the wet chamber in a torque-transmitting manner and can be moved axially corresponding to the overload spring, so that when the maximum torque is exceeded the support plate moves aside axially, and thus the pressing of the friction package is reduced or canceled. The wet chamber then forms a clamp around the at least one friction disk, which absorbs the clamping force. In an embodiment having a plurality of friction disks, intermediate plates are additionally provided between each two adjacent friction disks, which are likewise axially movable like the support plate and are preferably hooked into the wet chamber in a torque-transmitting manner, for example by means of toothing.

According to a preferred embodiment of the slip clutch, the wet chamber is connected to the input side or output side in a torque-transmitting manner by means of one of the following elements: a driver disk, preferably a flange and/or a so-called drive plate; a flexplate; or a flywheel.

In this preferred embodiment, the output side or the input side is formed by one of the elements named above, so that a simple torque routing is set up, preferably running from radially inside to radially outside, for example in the case of a traction pulley, to the traction means carrier or vice versa. The wet chamber is preferably as far as possible radially outside, so that on the one hand, due to the large torque lever a maximum torque can be set with the smallest possible clamping force by means of the overload spring, and on the other hand, with a version of the wet chamber that is closed radially outside, the greatest possible centrifugal forces act on the lubricant in the wet chamber, and thus during operation the lubricant is reliably preserved in the wet chamber and/or is uniformly distributed.

According to another aspect, the disclosure relates to a traction pulley with an axis of rotation for a traction drive, having at least the following components: a traction means carrier; a shaft connection; a slip clutch as described above; and preferably a damper unit between the traction means carrier and the shaft connection. The traction means carrier and the shaft connection are connected to each other by means of the slip clutch, protected against overload, in a torque-transmitting manner.

The traction pulley proposed here is configured for transmission of torque between a traction means carrier, for example a belt, preferably a v-belt, and a shaft connection, for example a spline connection, a central screwed connection or a multiple screwed connection. Inserted in between, i.e., in series, is a slip clutch according to an embodiment according to the above description, so that an overload torque above a predetermined maximum torque is not possible either from the traction means carrier to the shaft connection or vice versa. A damper unit, preferably a plate damper, is preferably also inserted between the traction means carrier and the shaft connection in series before or after the friction package. The slip clutch proposed here has the advantage that the preordained maximum torque can be fixed within a narrow boundary zone with little effort and/or over a relatively long life. Furthermore, a construction without additional axial and/or radial construction space is possible, so that the traction pulley proposed here can be employed as a replacement for a conventional traction pulley.

According to another aspect, the disclosure relates to a drivetrain having a drive unit with a drive shaft, at least one ancillary unit with an auxiliary shaft and at least one slip clutch according to an embodiment according to the above description, where the output shaft is connected by means of the at least one slip clutch to the at least one auxiliary shaft, protected against overload, in a torque-transmitting manner.

The drivetrain proposed here is configured to drive an auxiliary shaft of an ancillary unit, for example an air conditioner compressor or the generator shaft of a regenerative motor, by means of an output shaft of a drive unit, for example a crankshaft of an internal combustion engine. The slip clutch is configured to limit the transmission of torque between the output shaft and the at least one auxiliary shaft to a predetermined maximum torque. The slip clutch proposed here has the advantage that the predetermined maximum torque can be fixed within a narrow boundary zone with little effort and/or over a relatively long life. By particular preference, only random test measurements are necessary here for quality control and no 100% measurements are necessary during assembly. Alternatively or in addition, the force on the slip clutch, that is, for example, the pre-stressing of the overload spring, does not need to be adjustable.

According to a preferred construction of the drivetrain, the drive unit is an internal combustion engine and one of the ancillary units is a regenerative motor, which are preferably connected in a torque-transmitting manner by means of a traction drive, having a traction pulley on the output shaft and also on the auxiliary shaft of the regenerative motor, where at least one of the traction pulleys is designed according to an embodiment according to the above description.

The drivetrain proposed here is generally known as a hybrid drive, preferably as a belt starter hybrid, for example a PO hybrid, where the regenerative motor is configured to support the internal combustion engine by means of a delivery of torque from its generator shaft to the output shaft of the internal combustion engine through the traction drive, for example to start the internal combustion engine or for a torque boost, as well as picking up a sometimes high energy capture for operation of the regenerative motor in generator mode, for example to recuperate the braking energy of a motor vehicle. High energy inputs occur in this highly dynamic operation of the traction drive, in particular with high-power hybrid drives, so that it is not possible in every operating situation to rule out the decoupling of an excessive input of torque exclusively by means of a damper unit. For this application it is especially advantageous to employ a slip clutch according to an embodiment according to the above description, because that prevents high variance of the maximum torque, and consequently the efficiency is not impaired thereby.

According to another aspect, the disclosure relates to a motor vehicle having at least one driving wheel that can be driven by means of a drivetrain according to an embodiment according to the above description.

Most motor vehicles today have front wheel drive, and therefore by preference position the drive unit, for example an internal combustion engine and/or an electric driving motor, in front of the driver's compartment and transversely to the main direction of travel. The construction space is especially tight, particularly in such an arrangement, and it is therefore particularly advantageous to use a component of small construction size. Similarly configured is the use in two-wheeled motorcycles, for which increased power is demanded while the construction space remains the same.

This problem becomes more critical in the case of passenger cars of the small car class according to European classification. The functional units used in a passenger car of the small class are not significantly smaller compared to passenger cars of larger classes. Nevertheless, the available construction space is substantially smaller in small cars. Using the slip clutch proposed here makes safe operation possible while at the same time a reliably exact maximum torque is set. Furthermore, the slip clutch proposed here, or the corresponding traction pulley, can be employed without affecting the construction space compared to previously known slip clutches, or even with reduced axial construction space, due to a reduction of the friction lining thickness.

Passenger cars are classified in a vehicle class, for example, according to size, price, weight and power; this definition being subject to constant change according to the needs of the market. In the US market, vehicles of the small car and smallest car class according to European classification are classified as subcompact cars, and in the British market they correspond to the class of superminis or the class of city cars. Examples of the smallest car class are a Volkswagen up! Or a Renault Twingo. Examples of the small car class are an Alfa Romeo Mito, Volkswagen Polo, Ford Fiesta or Renault Clio.

BRIEF DESCRIPTION OF THE DRAWINGS

The disclosure described above will now be explained in detail against the relevant technical background, referring to the applicable drawings, which show preferred designs. The disclosure is in no way limited by the drawings, which are merely schematic; it must be noted that the drawings are not dimensionally consistent and are not suitable for defining size relationships. In the figures.

Ordinal numbers used in this description serve merely for clear differentiation, and represent no sequence or order of priority.

DETAILED DESCRIPTION

Figure 1:
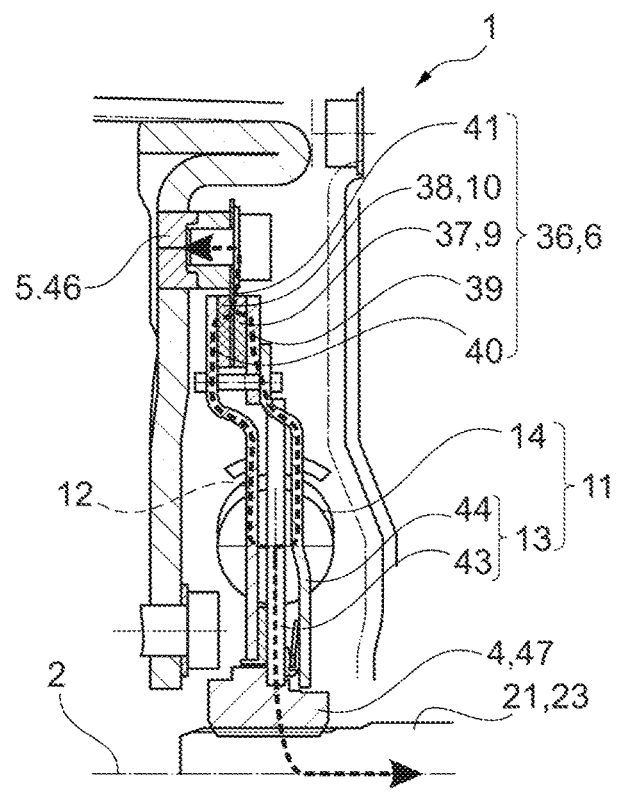
FIG. 1 shows a slip clutch with dry friction package in cross section.

FIG. 1 shows a slip clutch in cross section; exclusively conventional components are used here. The slip clutch 1 has an axis of rotation 2, to which all components shown are positioned concentrically or the majority of them rotationally symmetrically. Provided radially to the inside is an input side 4, realized here as a shaft connection 47 with a spline connection, which is firmly connected to an output shaft 21 or auxiliary shaft 23 in a torque-transmitting manner. Adjacent to the input side 4 is an inner disk 43, which here forms the torque input of the damper unit 11, which is realized here as a plate damper. The inner disk 43 is firmly connected on the input side to one or a plurality of spring dampers 14 in a torque-transmitting manner, while the spring damper 14 is firmly connected on the output side to an outer disk 44 in a torque-transmitting manner. As a result, torque can be transmitted with equalization between the inner disk 43 and the outer disk 44, which together form the carrier disk 13. The outer disk 44 is firmly connected here to a dry counter plate 40 and an axially movable dry support plate 39 in a torque-transmitting manner. Provided between the dry counter plate 40 and the dry support plate 39 are a first dry lining 37 and a second dry lining 38, fastened to a lining carrier 41. A torque below a predetermined maximum torque can be transmitted frictionally to the lining carrier 41 by the dry counter plate 40 and the dry support plate 39 by means of the first dry lining 37 and the second dry lining 38. By means of the lining carrier 41, the dry friction package 36 thus formed is firmly connected in a torque-transmitting manner with the output side 5, which is formed here by the traction means carrier 46, which is partially shown here by the flywheel, a flexplate or a drive plate. For clarification, the torque flow 12 is depicted with a dashed arrow; the arrowheads at both ends show that the terms input side 4 and output side 5 can also be defined inversely and merely indicate an example of a main operating state.

In a preferred embodiment, in a slip clutch 1, for example, according to the depiction in FIG. 1 only the first dry lining 37 and/or the second dry lining 38 are replaced by a first (wet) friction lining 9 and a second (wet) friction lining 10, respectively, which are, for example, oil-impregnated, greased or impregnated with a lubricant, so that the dry friction package 36 is then merely replaced by a wet friction package 6 without affecting construction space.

Figure 2:
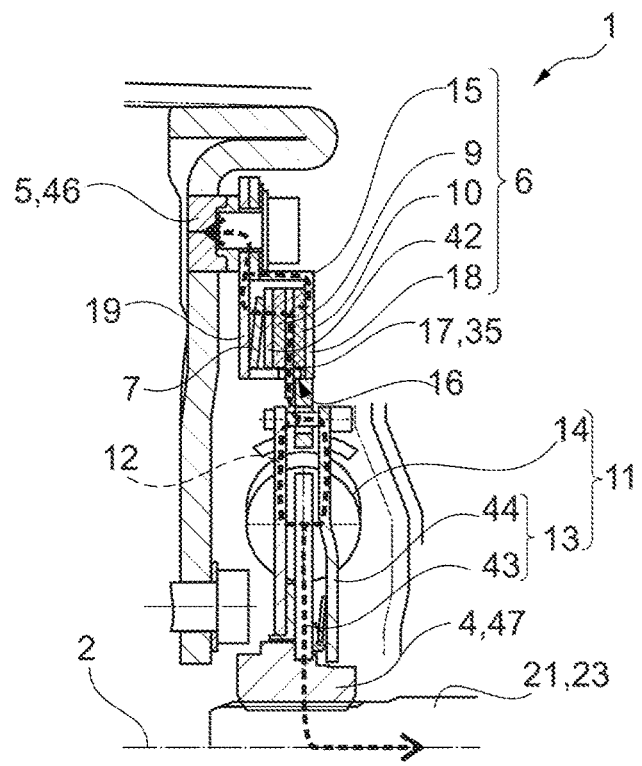
FIG. 2 shows a slip clutch with wet chamber in cross section.

FIG. 2 shows a slip clutch 1 in cross section, which is identical in basic configuration to the depiction in FIG. 1, but which merely serves to improve understanding and does not depict any limitation of the generality. In this respect, please see the above description. Adjacent to the outer disk 44 of the damper unit 11 in the slip clutch according to FIG. 2 is the lining carrier 35, on which a first friction lining 9 and a second friction lining 10 are positioned, which are located in a wet chamber 15. In the depiction, the wet chamber 15 forms a counter plate 18 to the right of the second friction lining 10, and to the left of the first friction lining 9 a support plate 42 is provided. Starting from an overload spring 7, realized here, for example, as a diaphragm spring, the support plate 42 exerts a clamping force on the friction package 6 thus formed. The overload spring 7 is braced here on the wet chamber 15, which forms a counter bearing 19 in this area of its side wall. The wet chamber 15 is closed radially outside and to the side, i.e., in the axial direction, so that the wet chamber 15 can be (pre-)filled with a lubricant. The lubricant is held in the wet chamber 15 by means of the existing centrifugal forces, or at a standstill is captured in the particular area of the wet chamber 15 located beneath in the gravitational field. Radially inside, the wet chamber 15 forms a through opening 16, through which a connecting element 17 extends, which is formed here by the lining carrier 35 and is firmly connected to the outer disk. Furthermore, the wet chamber 15 forms the torque-transmitting firm connection to the output side 5. The torque flow 12 runs here through the counter plate 18 and the counter bearing 19, and is conducted via the wet chamber 15 into the output side 5.

Figure 3:
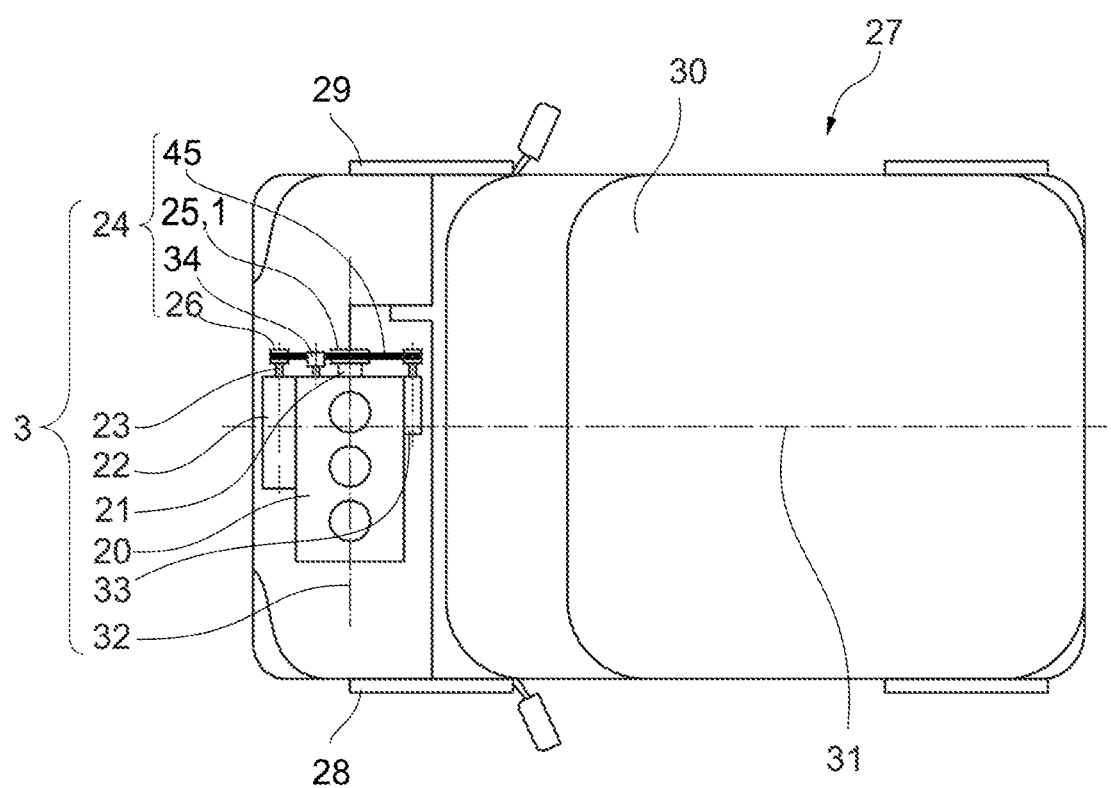
FIG. 3 shows a drivetrain with traction drive in a motor vehicle.

FIG. 3 shows a schematic view of a drivetrain 3 having a traction drive 24 in a motor vehicle 27. The drivetrain 3 includes a drive unit 20, which is depicted here by way of example as a 3-cylinder internal combustion engine, and a (first) ancillary unit 22, which is, for example, a regenerative motor. Through the auxiliary shaft 23, to which a second traction pulley 26 is firmly connected in a torque-transmitting manner, torque can be transmitted from the ancillary unit 22 to the output shaft 21 of the drive unit 20, to which a first traction pulley 25 is firmly connected in a torque-transmitting manner, by means of a traction means 45, for example a v-belt. The first traction pulley 25 and/or the second traction pulley 26 includes a slip clutch 1, connected, for example, in accordance with the depiction in FIG. 2. The traction drive 24 here also includes an additional ancillary unit, for example an air conditioner compressor 33, and the traction means 45 is tensioned by means of a tensioning pulley 34 to an appropriate traction force for a desired torque. The drive unit 20 is positioned with its motor axis 32 transverse to the longitudinal axis 31 of the motor vehicle 27, and is located in front of the driver's compartment 30 in the main direction of travel. A left driving wheel 28 and a right driving wheel 29 can be driven by means of the drivetrain 3; this is depicted here merely schematically.

The wet chamber 15 is preferably located in the radial direction of the slip clutch 1 completely inside the screwed connection of the slip clutch 1 on the output side 5, or on the flywheel. The plates or sheets which delimit the wet chamber 15 in the axial direction of the slip clutch 1, i.e., the counter plate 18 and the counter bearing 19, are preferably closed by the screwed connection of the slip clutch 1 to the output side 5 or the flywheel.

The slip clutch proposed here makes an increase in the constancy of friction coefficient possible while the needed construction space remains the same or is reduced.

REFERENCE NUMERALS 1 slip clutch
2 axis of rotation
3 drivetrain
4 input side
5 output side
6 friction package
7 overload spring
8 clamping force
9 first friction lining
10 second friction lining
11 damper unit
12 torque flow
13 carrier disk
14 spring damper
15 wet chamber
16 through opening
17 connecting element
18 counter plate
19 counter bearing
20 drive unit
21 output shaft
22 ancillary unit
23 auxiliary shaft
24 traction drive
25 first traction pulley
26 second traction pulley
27 motor vehicle
28 left driving wheel
29 right driving wheel
30 driver compartment
31 longitudinal axis
32 engine axis
33 air conditioner compressor
34 tensioning pulley
35 lining carrier
36 dry friction package
37 first dry lining
38 second dry lining
39 dry support plate
40 dry counter plate
41 lining carrier
42 support plate
43 inner disk
44 outer disk
45 traction means
46 traction means carrier
47 shaft connection

The invention claimed is:

1. A slip clutch, comprising:
an axis of rotation;
an input side;
an output side;
a pressable friction package for transmitting a predetermined maximum torque between the input side and the output side, the pressable friction package comprising:
   a lubricated friction lining comprising a predetermined coefficient of friction; and
   an overload spring for applying an axial clamping force to the pressable friction package, wherein:
the pressable friction package is housed in a wet chamber fillable with a lubricant and
the wet chamber comprises:
   a counter plate of the pressable friction package; or
   a counter bearing for the overload spring.

2. The slip clutch of claim 1 wherein the predetermined maximum torque is determined at least partially by the predetermined coefficient of friction and the axial clamping force.

3. The slip clutch of claim 1, further comprising a damper unit inserted in a torque path between the input side and the output side.

4. The slip clutch of claim 3 wherein the damper unit is a plate damper comprising a spring damper arranged in a carrier disk.

5. The slip clutch of claim 1 wherein:
the slip clutch further comprises a connecting element for connecting the pressable friction package to the input side or the output side in a torque-transmitting manner
the wet chamber is closed radially outside;
the wet chamber comprises a through opening; and
the connecting element is disposed in the through opening.

6. The slip clutch of claim 1 wherein the overload spring is a diaphragm spring.

7. The slip clutch of claim 1 wherein:
the wet chamber is connected to the input side or the output side by a driver disk; or
the wet chamber is connected to the input side or the output side by a flexplate; or
the wet chamber is connected to the input side or the output side by a flywheel.

8. A drivetrain comprising:
a drive unit with an output shaft; and
an ancillary unit with an auxiliary shaft connected to the output shaft in a torque-transmitting manner by the slip clutch of claim 1, wherein the slip clutch protects the output shaft and the auxiliary shaft against an overload torque greater than the predetermined maximum torque.

9. A motor vehicle comprising having a driving wheel drivable by the drivetrain of claim 8.

10. A traction pulley for a traction drive, comprising:
a slip clutch, comprising:
an axis of rotation;
an input side;
an output side;
a pressable friction package for transmitting a predetermined maximum torque between the input side and the output side, the pressable friction package comprising:
a lubricated friction lining comprising a predetermined coefficient of friction; and
an overload spring for applying an axial clamping force to the pressable friction package;
a traction means carrier;
a shaft connection connected to the traction means carrier in a torque-transmitting manner by the slip clutch; and
a damper unit arranged between the traction means carrier and the shaft connection, wherein the slip clutch protects the traction means carrier and the shaft connection against an overload torque greater than the predetermined maximum torque.

11. A drivetrain comprising:
an internal combustion engine comprising an output shaft with an output shaft traction pulley;
a regenerative motor comprising an auxiliary shaft with an auxiliary shaft traction pulley; and
a traction drive connecting the output shaft traction pulley to the auxiliary shaft traction pulley in a torque-transmitting manner, wherein the output shaft traction pulley or the auxiliary shaft traction pulley comprises the traction pulley of claim 10.

12. A motor vehicle comprising a driving wheel drivable by the drivetrain of claim 11.

\* \* \* \* \*